2,750,326
PROCESS AND COMPOSITION FOR DYEING HAIR

Wolfgang Max Joseph Eckardt, Bad Segeberg, Holstein, Germany, assignor to Lever Brothers Company, New York, N. Y., a corporation of Maine No Drawing. Application January 24, 1952, Serial No. 268,125

Claims priority, application Germany February 7, 1951

3 Claims. (Cl. 167—88)

This invention relates to a process for dyeing animal fibers and particularly human hair and to a composition for use in this process.

To dye animal fibers, and in particular human hair, use has hitherto been made of nitro dyes which contain an aromatic radical to which there are attached one or more nitro groups and one or more amino or hydroxyl groups, for example 2-nitro-1,4-phenylene diamine, 4-nitro-1,2-phenylene diamine, picramic acid, 4-nitro-2-amino phenol, etc.

These dyes suffer from the disadvantage of being not very soluble in water, so that the concentration required for a desired depth of color can often not be obtained.

It has now been found that an appreciably improved water solubility and a deeper color can be achieved by replacing one of the hydrogen atoms of the amino group or groups by an aliphatic radical containing at least one hydroxyl group. These dyes are very suitable for the dyeing of animal fibers. In particular they may be used to impart a good and lasting color to human hair.

The instant invention relates to a composition for dyeing animal fibers which contains a nitro dye of the general formula $(NO_2)_m R X_n (NHR')_p$, where R is an aromatic radical, X is an amino or hydroxyl group and R' an alkylol group, for example, methylol $CH_2OH$, ethylol $CH_2CH_2OH$, propylol $CH_2CH_2CH_2OH$, $\beta$-$\gamma$-dihydroxy propylol or a polyethylene or polypropylene glycol group. One or more of the hydroxy groups of the alkylol group can, if desired, be esterified with an inorganic or organic acid. In particular, the compounds containing the methylol group may be less stable, but this drawback can be overcome by esterifying the hydroxyl group with an inorganic acid. Polybasic acids such as sulfurous, sulfuric and the various phosphoric acids are preferred.

There should be at least one nitro group and one NHR' group and, therefore, m and p have a value of at least 1, whilst the number of amino or hydroxyl groups (X in the above formula) together with the number of NHR' groups should be at least 2, i. e. the sum of n and p should be at least 2. If p equals 2, therefore, n can equal 0. Thus, if there is one NHR' group, the compound should contain at least one amino or hydroxy group, but if the compound contains two or more NHR' groups, an amino or hydroxyl group is not necessary.

As the alkylol group R' an ethylol group $CH_2CH_2OH$ is preferred, R is preferably benzene, in which event the above general formula takes the following form:

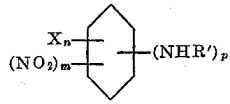

where:
m=1 to 4
p=1 to 5
n=0 to 4
and where X and R' are the same as before.

The following are examples of dyestuffs which come within the scope of the above formulae:

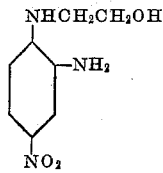
1-($\beta$-ethylolamino)-2-amino-4-nitrobenzene

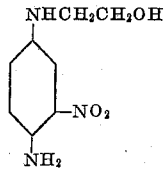
1-($\beta$-ethylolamino)-4-amino-3-nitrobenzene

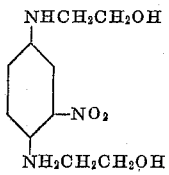
1:4-di-($\beta$-ethylolamino)-3-nitrobenzene

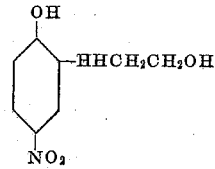
1-hydroxy-2-($\beta$-ethylolamino)-4-nitrobenzene

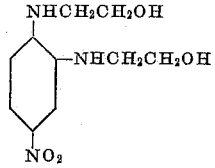
1,2-di-($\beta$-ethylolamino)-4-nitrobenzene

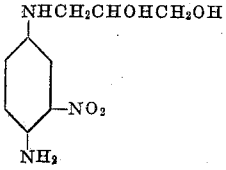
1-($\beta$,$\gamma$-dihydroxy propylamino)-4-amino-3-nitrobenzene

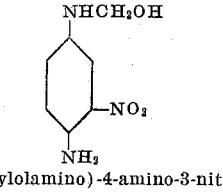
1-($\beta$-methylolamino)-4-amino-3-nitrobenzene

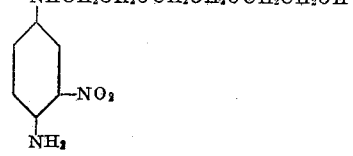
1-(triglycolamino)-3-nitro-4-aminobenzene

These dyestuffs can be prepared by simple chemical procedures as will be evident from the following examples.

The composition employed for dyeing hair and other animal fibers can be prepared by dissolving or dispersing the dyestuff in water to produce a solution of the desired concentration using, if necessary, a conventional blender or dispersing apparatus. Water-miscible organic solvents such as ethyl alcohol can be employed to facilitate solution; in this event, the dye can be dissolved first in the alcohol, which solution is then diluted with water to the desired concentration.

The dispersion of the dyestuff may also be facilitated by addition of a detergent or dispersing agent. A detergent such as an alkyl sulfate or a fatty alcohol sulfonate, i. e. lauryl or myristyl sulfate or sulfonate will also facilitate absorption and retention of the dye by the fiber.

It is desirable but not essential to adjust the pH of the dispersion or solution to 8 or less and preferably in the range from 6.5 to about 7.5. Use of dispersions or solutions having a pH of 8 or less will minimize the effect of the treatment upon the gloss, texture and strength of the fiber.

The material employed to adjust the pH will be an acid or base such as potassium carbonate depending upon the initial pH but it should not attack the hair or other fiber.

Buffer combinations may also be employed in order to maintain the pH of the dispersion of the solution constant during dyeing.

This composition is then applied to the fiber or hair in such a way as to saturate it thoroughly therewith. This may conveniently be accomplished by immersing the material in the liquid or by combing or brushing out the material and by saturating it with a comb wet with the liquid and by like means to those skilled in the art.

The intensity and shade of color obtained primarily depend upon both the concentration of the liquid and the dyeing temperature. Best results are obtained in the temperature from 20 to 30° C. and when the dye concentration does not exceed 3%. For most purposes, a concentration in the range from 1 to 2% is preferable but much less than 1% may be adequate under certain circumstances.

It will be appreciated by those skilled in the art that the intensity of shade will also be dependent to some extent upon the dyeing time and upon the nature of the dye. For this reason, specific conditions in every dyeing cannot be given but those skilled in the art will note from the above disclosure and the following examples what conditions to employ in a given case.

The composition and process of the invention are applicable to animal fibers of all types including human hair and wool.

EXAMPLE 1

*1-(β-ethylolamino)-2-amino-4-nitrobenzene*

140 parts of water are heated to 70–80° C. together with 140 parts of isopropyl alcohol and 56 parts of monoethanolamine and then, over a period of two hours, 70 parts of 2,4-dinitro-chlorobenzene are stirred in. This is followed by heating for another two hours at 70° C., allowing to cool, and separating the precipitated yellow condensation product by means of a suction filter. Yield almost 100%. The melting point of the product purified by recrystallization from alcohol is about 92° C.

The product is reduced by means of a sodium polysulfide solution made as follows:

61.5 parts of a 60% sodium sulfide and 16.2 parts of sulfur are dissolved at 70–80° C. and the solution is filtered.

167 parts of water, 167 parts of isopropyl alcohol and 72 g. of the crude condensation product described above are then mixed and heated to 70° C., after which the sodium polysulfide solution is run in. After cooling, the resultant dye is separated by means of a suction filter. Yield 75–80%.

The melting point of the dye compound recrystallized from alcohol is about 133° C.

To prepare a dye solution 0.2 g. of the dye is dissolved in 2 cc. of hot alcohol, 0.25 g. of potassium carbonate and 1.5 g. of a fatty alcohol sulfonate are added, and the solution is made up to 100 g.

A bright golden yellow color of good moisture resistance may be obtained on hair or wool.

EXAMPLE 2

*1-(β-ethylolamino)-4-amino-3-nitrobenzene*

6 parts of chemically pure 2-nitro-1,4-phenylene diamine are finely powdered and then heated together with 5 parts of anhydrous sodium acetate and 12 parts of ethylene chlorohydrin for 3 hours at 95° C. 120 parts of water are then added and the pH of the solution is adjusted to 3 by the addition of hydrochloric acid. After heating for half an hour with a little activated carbon the pH of the filtrate is adjusted to 7.2 with caustic soda solution. Stirring with activated carbon is repeated, followed by filtration. The filtrate is thoroughly extracted with acetic ester, which latter is then distilled off. The residue is taken up in 16 parts of 12% hydrochloric acid and the whole evaporated to a small volume. The product is allowed to cool and the hydrochloric acid salt of the dye base is filtered off by suction. The dye base itself is obtained by dissolving the crystals of the hydrochloric acid salt in about 10 parts of water and then making the solution slightly alkaline with caustic soda. The dye separates in the form of violet crystals which contain one mole of water of crystallization and melt at 98° C. when anhydrous.

To prepare a dye solution 0.8 g. of the dye is dissolved in 2 cc. of alcohol and the solution made up to 100 cc., 0.5 g. of potassium carbonate and 1.5 g. of fatty alcohol sulfonate having been added.

Its effect on wool or hair is to dye it a reddish violet color.

EXAMPLE 3

*1-hydroxy-2-(β-ethylolamino)-4-nitrobenzene*

6 parts of p-nitro-o-amino phenol are finely ground with 5 parts of anhydrous sodium acetate. 12 parts of ethylene chlorohydrin are mixed in, 0.05 part of iodine are added, and the whole heated on a steam bath for 3½ hours. 50 parts of water, 4.1 parts of chemically pure hydrochloric acid ($D=1.19$) and 1 part of activated carbon are then added. The mixture is left to stand overnight and is then filtered. Then the solution is neutralized with approximately 7 parts of 8% caustic soda solution. This is followed by extraction with acetic ester, drying with sodium sulfate, filtration and evaporation to crystallize. The dye is obtained in the form of slightly yellowish crystals of melting point 136° C.

1 part of the dye is dissolved in 2.5 parts of alcohol, 2 parts of 25% ammonia, 93.5 parts of water and 1 part of any desired wetting agent. When hair or wool are treated, a bright brick-red is obtained of a shade which is considerably more red than that obtainable with 4-nitro-2-amino phenol.

EXAMPLE 4

*1,2-di-(β-ethylolamino)-4-nitrobenzene*

7.7 parts of 1-(β-ethylolamino)-2-amino-4-nitrobenzene are finely ground with 5 parts of anhydrous sodium acetate and the mixture is then heated on a steam bath for 6 hours. 0.1 part of iodine is then added and heating is continued for another 4 hours on the steam bath and a further 3 hours in an oil bath at 140° C. The mixture is cooled, diluted with 50 parts of water and the precipitated product is separated by suction. It is purified by recrystallization from water into brownish red needles. Melting point is 148° C.

A 0.4% solution in alcohol (2.5% aqueous) with the addition of 1% of a wetting agent applied to hair or wool imparts a brilliant orange-yellow color.

EXAMPLE 5

*1-(β,γ-dihydroxy-propyl amino)-4-amino-3-nitrobenzene*

6 parts of O-nitro-p-phenylene diamine are finely ground with 5 parts of anhydrous sodium acetate and then mixed with 16.5 parts of glycerine-γ-chlorohydrin and 0.05 part of iodine before heating on a steam bath for 3 hours. 50 parts of water, 9.2 parts of chemically pure hydrochloric acid and 1 part of activated carbon are then added. The mixture is heated on a steam bath for ½ hour. After filtration, 12 parts of sodium carbonate crystals and 1 part by weight of activated carbon are added. The mixture is allowed to stand for 3 hours at room temperature and is then filtered. The filtrate is extracted with acetic ester, which is followed by drying with sodium sulfate and evaporation of the solvent until dry. 10 parts of a thick dark violet oil are obtained.

1.5 parts of this oil are dissolved in 97.5 parts of alcohol (2.5% aqueous) and 1 part of a wetting agent is added. When applied to wool, a strong reddish violet shade of excellent covering power is obtained.

EXAMPLE 6

*Bisulfite ester of 1-(β-methylolamino)-4-amino-3-nitrobenzene*

12 parts of 2-nitro-1,4-diaminobenzene and 16 parts of sodium bisulfite are suspended in 100 parts of water. The suspension is heated at 100° C. for about ½ hour and is then allowed to cool, after which 16 parts of a 28% formaldehyde solution are added.

After standing for 5 days, the crystal sludge is filtered off by suction and re-crystallized from 50% alcohol. Brown crystals are obtained which melt with decomposition at 170–172° C.

A 2.5% aqueous solution gives hair and wool a violet color of good moisture resistance.

EXAMPLE 7

*Bisulfate ester of 1-(β-ethylolamino)-2-amino-4-nitrobenzene*

5 parts of the 1-(β-ethylolamino)-2-amino-4-nitrobenzene obtained according to Example 1 are added to 10 parts of chemically pure sulfuric acid. During the addition the temperature rises to 40° C. A further 5 parts of sulfuric acid are added and the mixture is heated on a steam bath for 30 minutes. After leaving to stand overnight, 50 parts of water and 60 parts of a 50% caustic potash solution are added. The crystal mass is filtered by suction and dried at 60° C.

2 parts of the dye are dissolved in 100 parts of water, with the addition of any wetting agent. When applied to hair or wool, a brilliant orange yellow of great intensity is obtained, which is even more brilliant than that described in Example 1.

A further disadvantage of existing dyes is that neither when used individually nor when mixed with one another do they produce on grey hair a shade resembling the natural colour. Only red and yellow shade or mixtures of these shades can be obtained but brown shades cannot. By using dyes according to the present invention and in particular mixtures containing the dye prepared as in the following example, it is possible to produce chestnut brown shades even on grey hair.

EXAMPLE 8

*1:4-di-(β-ethylolamino)-3-nitrobenzene*

6 parts of 3-nitro-1:4-diaminobenzene are finely ground with 6.5 parts hydrated and 6 parts anhydrous sodium acetate. 20 parts of ethylene chlorohydrin are added and also 0.1 part of iodine. The mixture is heated in an oil bath under reflux for 3 hours, when the temperature of the oil bath should be 142–147° C. After cooling, 20 parts of chemically pure hydrochloric acid (density=1.19) are added and the product of reaction is allowed to stand in a refrigerator for 4 days at −20° C. The precipitated product, which consists principally of sodium chloride, is then filtered off by suction. The solution can be used directly for making a hair dyeing composition, for example, as follows:

10 parts of the solution are mixed with 6 parts of ammonia (25%) and water is added to make up to 95 parts. 2 parts of a wetting agent are added and the whole is mixed with a solution of 0.6 part of the dyestuff described in Example 1 in 3 parts of warm alcohol.

A beautiful chestnut brown shade can be obtained on grey hair by dyeing in the ordinary way.

It will be seen from the foregoing examples that $m$, $n$ and $p$ in the general formula of the dyes according to the invention are preferably each 1 and R is a benzene ring. When this is so, the NHR′ is preferably a β alkylolamino group which may stand in the ortho or para position relative to the amino or hydroxyl group. Preferably this β alkylolamino group is the β ethylolamino group.

Compositions according to the invention may contain any adjunct known to those skilled in the art as suitable in dyeing compositions.

In the specification and claims all parts and percentages are by weight.

The term "consisting essentially of" as used in the claims means that the composition contains the essential ingredients listed and the term does not exclude supplemental ingredients which do not change the composition or make it injurious to hair, such as thickeners, wetting agents, buffers, etc. Thus, components such as oxidizing agents would not be included in the compositions of the invention.

I claim:

1. A composition for dyeing human air attached to the skin consisting essentially of an aqueous solution having a pH below about 8 of 1:4-di-(β-ethylolamino)-3-nitrobenzene.

2. The method of dyeing hair attached to the skin which comprises treating the hair at a temperature between 20 and 30° C. with a composition consisting essentially of a nitro dye having the general formula $(NO_2)_m RX_n (NHR')_p$ where R is an aromatic radical, X is a radical selected from the group consisting of $NH_2$ and hydroxyl groups, R′ is an alkylol group having one to three carbon atoms and a single hydroxyl group, $m$ is an integer of at least 1, $p$ is an integer of at least 1, and the sum of $n$ and $p$ is an integer of at least 2.

3. The method of dyeing hair attached to the skin which comprises treating the hair at a temperature between 20 and 30° C. with a composition consisting essentially of a nitro dye having the general formula $(NO_2)_m RX_n (NHR')_p$ where R is an aromatic radical, X is a radical selected from the group consisting of $NH_2$ and hydroxyl groups, R′ has one to three carbon atoms and is selected from the group consisting of alkylol groups and alkylol groups esterified with a polybasic inorganic acid, $m$ is an integer of at least 1, $p$ is an integer of at least 1, and the sum of $n$ and $p$ is an integer of at least 2.

References Cited in the file of this patent

UNITED STATES PATENTS

| Number | Name | Date |
|---|---|---|
| 1,932,901 | Lehmann | Oct. 31, 1933 |
| 2,019,626 | Olpin et al. | Nov. 5, 1935 |
| 2,022,245 | Lehmann | Nov. 26, 1935 |
| 2,202,902 | Ellis et al. | June 4, 1940 |
| 2,338,380 | Hester et al. | Jan. 4, 1944 |
| 2,434,564 | Hester et al. | Jan. 13, 1948 |

FOREIGN PATENTS

| 189,054 | Great Britain | Nov. 23, 1922 |